J. Molyneux.
Oil Pump.

No. 1,789. Reissued Oct. 4, 1864.

Witnesses:
Charles Howson
H. Allen Dale

Inventor:
J. Molyneux
Henry Howson
Atty

UNITED STATES PATENT OFFICE.

THE BORDENTOWN MACHINE COMPANY, OF BORDENTOWN, NEW JERSEY, ASSIGNEES OF JAMES MOLYNEUX.

IMPROVEMENT IN APPARATUS FOR FORCING OIL FROM OIL-WELLS.

Specification forming part of Letters Patent No. 42,213, dated April 5, 1864; Reissue No. 1,789, dated October 4, 1864.

*To all whom it may concern:*

Be it known that THE BORDENTOWN MACHINE COMPANY, of Bordentown, New Jersey, are the owners of certain Letters Patent for Apparatus for Raising Oil from Wells, granted to JAMES MOLYNEUX, of Bordentown, New Jersey, on the 5th day of April, 1864; that the said company deem the said patent inoperative and invalid by reason of a defective specification, and that I, JOHN L. MCKNIGHT, president of and acting for and on behalf of the aforesaid company, do hereby declare the following to be a full, clear, and exact description of the said invention, reference being had to the accompanying drawings, and to the letters of reference marked thereon.

The invention consists of apparatus, fully described hereinafter, for forcing oil from oil-wells without the aid of the complex pumping apparatus usually employed for the purpose.

In order to enable others to practice the invention, I will now proceed to describe the manner of carrying it into effect.

Figure 1:
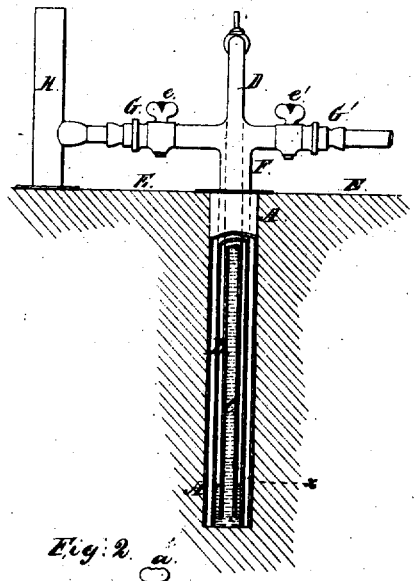
Figure 2:
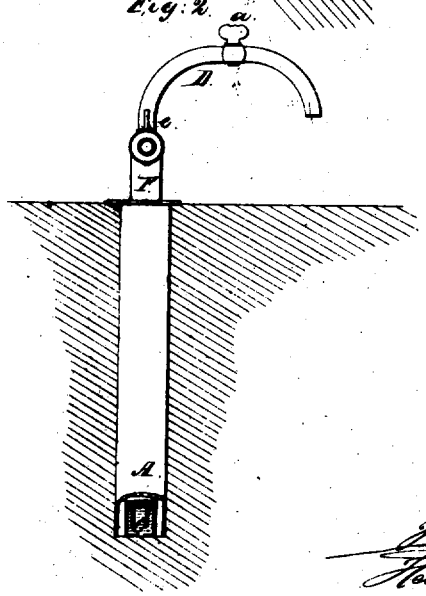

On reference to the accompanying drawings, which form a part of this specification, Figure 1 represents a vertical section of an oil-well, exhibiting the mode of raising oil from the same; and Fig 2 is a side view of Fig. 1.

A represents the extension-pipe of an ordinary petroleum-oil well, B being the inner pipe, through which the oil is permitted to rise when the flow is spontaneous, or through which the oil is pumped when mechanical aid is required to raise the oil. C is a smaller supplementary pipe placed within the pipe A, its lower end being immersed in the oil which remains in the well, and the surface of which is indicated by the line *x*. This small pipe C is continued upward through the well, and projects above the surface E of the ground, passing through a pipe, F, which may be termed a continuation of the pipe B, and communicating with the discharge-pipe D, the latter being furnished with a suitable cock or valve, *a*.

The pipe F has two branches, G and G′, each being furnished with a cock or valve, *e*, the branch G communicating with an ordinary air pump, H, which has the usual piston and valves, and the pipe G′ communicating with a steam-boiler under circumstances described hereinafter.

It is well known that many of the wells in the oil districts of Pennsylvania will continue to discharge oil spontaneously for some time. The spontaneous flow of oil, however, frequently ceases, in which case the wells are either entirely abandoned or resort is had to an elaborate system of pumps for raising the oil.

By the invention of JAMES MOLYNEUX the use of the usual pumping apparatus is dispensed with, the oil being forced from the spent well by compressed air or steam under a considerable pressure.

When compressed air is used, the cock *e′* of the branch pipe G′ is closed, and the cock *e* of the branch pipe G opened, as is also the cock *a* of the discharge-pipe D. The piston of the pump H is then operated by means of any adjacent steam-engine with suitable gearing. The compressed air, for which a free passage is afforded through the annular space between the pipes F and D, and thence downward between the pipes B and C, acts on the surface of the oil at *x* and forces the same through the internal pipe, C, and discharge-pipe D with a rapidity commensurate with the force applied.

Although the use of compressed air for forcing the oil from the wells is preferred, it may be more convenient in some instances to use steam under a considerable pressure. In this case the cock *e* of the branch pipe G is closed, the operation of the pump H is discontinued, and the cock *e′* of branch pipe G′ opened, when a result similar to that described above will take place.

Although I have described the mode of forcing oil from wells which have ceased to discharge oil spontaneously, it is applicable to oil-wells generally in lieu of pumping apparatus.

In some instances the inner supplementary pipe, C, may be dispensed with—as, for instance, when there is little or no water within the outer pipe. In this case the compressed air may pass down the space between the outer pipe and pipe B, the oil being forced through the latter pipe.

Without claiming, broadly, the raising of fluids by the pressure of air or steam applied to the surface, I claim as the invention of the aforesaid JAMES MOLYNEUX, and desire to secure by Letters Patent—

The pipe B of an Artesian oil-well, (with or without a supplementary pipe,) so combined with a pump or steam-boiler that by the use of compressed air or steam the oil in the well may be forced upward therefrom through the pipe B or through a supplementary pipe, all substantially as set forth.

In testimony whereof I have signed my name to this specification before two subscribing witnesses.

J. L. MCKNIGHT,
*President of the Bordentown Machine Company.*

Witnesses:
GEO. W. THOMPSON,
THOMAS BENNETT.